Sept. 29, 1931. I. THOMAS ET AL 1,825,025
FISHING TOOL
Original Filed Feb. 1, 1928  2 Sheets-Sheet 1

Inventor
Idris Thomas
Ernest F. Tibbet
By Lyon & Lyon
Attorneys

Sept. 29, 1931.   I. THOMAS ET AL   1,825,025
FISHING TOOL
Original Filed Feb. 1, 1928    2 Sheets-Sheet 2
Fig.8.
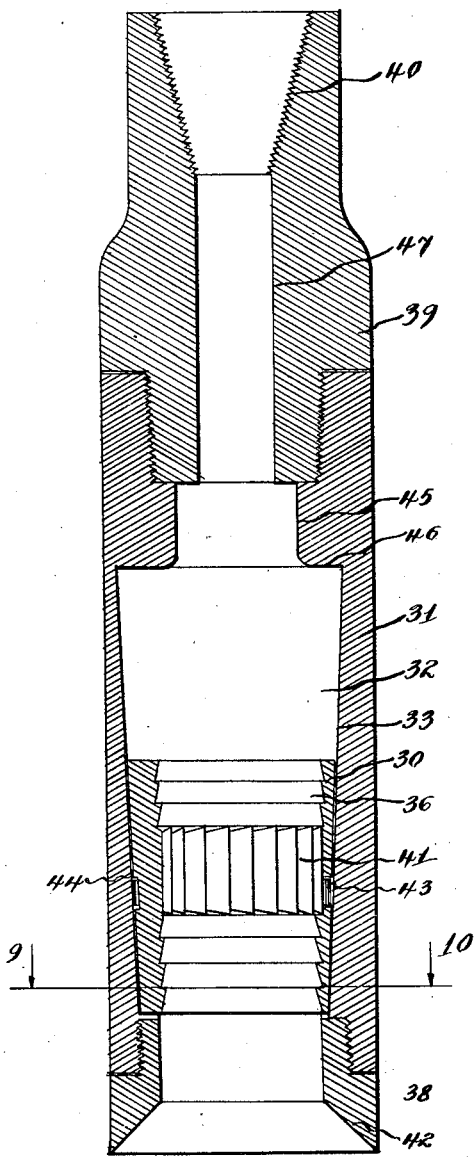
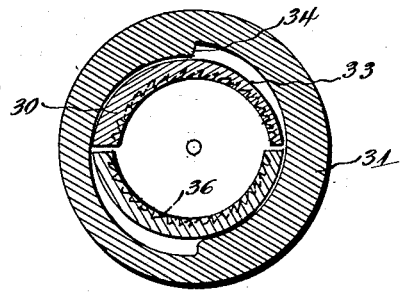
Fig.9.
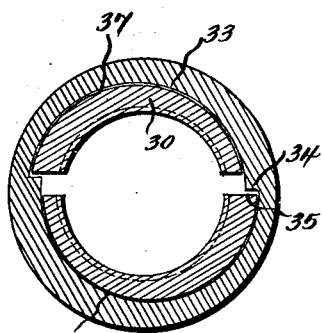
Fig.10.
Inventor
Idris Thomas,
Ernest S. Tibbett.
By Lyon & Lyon
Attorneys Patented Sept. 29, 1931

1,825,025

UNITED STATES PATENT OFFICE

IDRIS THOMAS, OF WHITTIER, AND ERNEST I. TIBBET, OF HUNTINGTON PARK, CALIFORNIA

FISHING TOOL

Application filed February 1, 1928, Serial No. 251,032. Renewed November 7, 1930.

This invention relates to a fishing tool for recovering a "lost" object, such as a drilling tool or twisted-off drill collar, etc., from a deep well. Fishing tools of this type usually include slips which are relatively movable and which are actuated in some way from the mouth of the well to cause them to grip the "fish".

The general object of this invention is to provide a fishing tool of simple construction, which can be readily applied to the "fish" by longitudinal movement, and which, by rotary movement of the fishing tool, the slips can be actuated to grip the "fish". Actuating such slips by rotary movement, instead of by a jar in a vertical direction, is very advantageous because in deep wells the drill string has considerable weight, and its inertia is, consequently, very great. However, one of the difficulties arising from the use of a fishing tool which is actuated by a rotary movement, is that unless a torque or twisting stress is maintained in the tool string after the "fish" has been "caught", the slips may become loose. One of the objects of this invention is to overcome this difficulty and to provide a fishing tool which will readily actuate the slips by the rotary movement to grasp the "fish", and which is so constructed that the weight of the "fish" or "lost" string of casing will operate to increase the grip or "bite" of the slips as soon as the upward pull of the tool string occurs after the "fish" is "caught".

Though in the usual operation of the tool the "fish" will be caught by a relative rotation of the parts of the tool, the tool is so constructed that the "fish" may be caught by a relative vertical movement of the parts, and released by relative rotation of the parts. While it is preferable to catch the "fish" by a relative rotary movement when operating in deep wells, in shallower wells it is feasible, with our fishing tool, to catch "fish" by a relatively upward movement of the tool string, thereby causing an upward movement of some parts of the tool with relation to other parts, which movement will project the slips toward the "fish" to grip the same.

The invention may be applied to "inside" or "outside" fishing tools.

The tool has a wedge part with thrust faces that force the slips against the "fish". By effecting a relative rotation of the wedge part with respect to the slips, the thrust faces are brought out of line with the slips, thereby releasing the slips.

Further objects of the invention will appear hereinafter.

The invention consists in the novel parts and combinations of parts to be described hereinafter, all of which contribute to produce an efficient fishing tool.

A preferred embodiment is found in the specification, while the broad scope of the invention is pointed out in the appended claims.

In the drawings,

Figure 1 is a side elevation of a fishing tool embodying our invention, certain parts being shown in elevation and others in longitudinal section. This view shows the keys in elevation. It illustrates an embodiment of the invention as adapted to an "inside" fishing tool or spear.

Figure 8 is a vertical section through an "outside" fishing tool, and Figures 9 and 10 are horizontal sections through this view, taken on the line 9—10.

In practicing the invention, we provide an elongated retaining member for carrying the jaws or gripping slips that grip the "lost" article or "fish", which is to be recovered from the well; this retaining member has curved eccentric faces which are eccentric to its longitudinal axis. In addition to these, curved faces are inclined longitudinally with respect to the axis of the tool and in a direction which will operate to tighten the grip of the slips on the "fish" after the "fish" has been "caught" by the rotation of the tool. Slips of arcuate form are carried by the retaining member, and they have curved faces on one side to cooperate with the curved faces of the retaining member, and have teeth on their opposite sides to grip the "fish". The construction is such that after the fishing tool has been slipped over or into the "lost" article, a relative rotation of the retaining member will cause a relative movement of the slips along the eccentric curved faces, and thereby cause the slips to move forward and grip the "fish". An opposite rotation will release the fish. For this purpose the thrust faces on the mandrel, or body, have relieved, or cut-back faces, that permit the slips to recede when this releasing rotation occurs. In the case of an "outside" fishing tool, in the gripping movement the slips, of course, would approach each other. In the case of an "inside" fishing tool, the slips would move outwardly to grip the inside wall of the tubular object, such as a twisted-off drill pipe.

Figure 1:
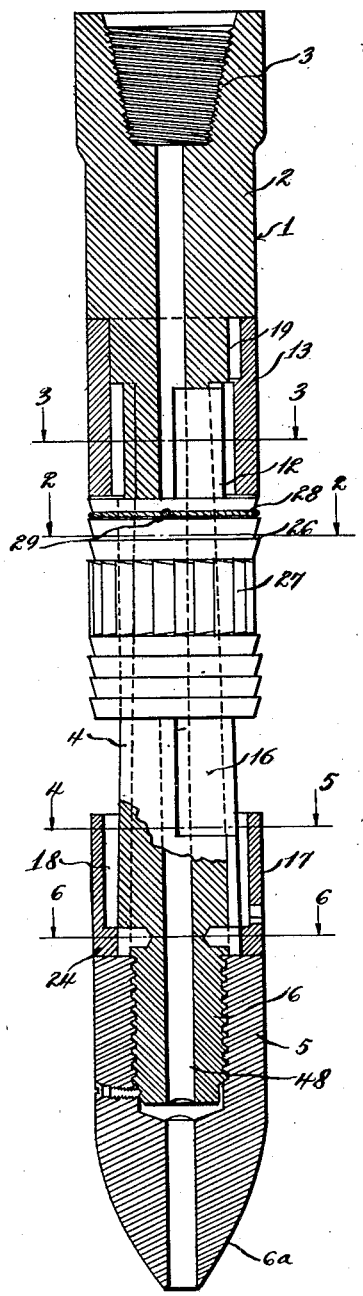
Figure 3:
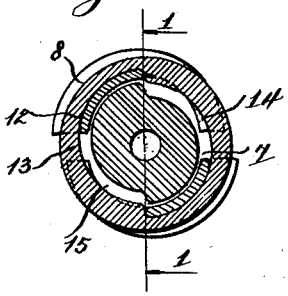
Figure 3 is a horizontal cross section on the line 3—3 of Figure 1, and particularly illustrating the construction of the device in the vicinity of the upper ends of the slips.
Figure 4:
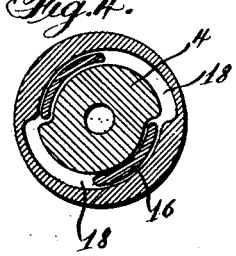
Figure 4 is a horizontal section on the line 4—5 of Figure 1, illustrating the relation of the parts when the slips are in the retracted position which they have when the spear is being passed into the upper end of the "fish".

In Figure 1 we illustrate the preferred embodiment of an "inside" fishing tool. This tool has a body 1 in the form of a mandrel, the upper end of which is formed into a head 2 with means, such as a threaded box 3, to enable it to be attached to the lower end of the tool string. The middle portion of the body is in the form of a tapered neck 4, having a wedge part and a releasing part, the large end of the neck being disposed downwardly, and the lower end of the tool being formed by a detachable head 5 which is screwed onto a threaded extension 6 beyond the neck. The tool has a rounded or conical nose 6ª at its lower end which facilitates its being thrust into the upper end of the tubing or drill pipe which is to be recovered. The neck is constructed so that a relative upward pull will project the slips out to grip the casing and so that a relative rotation in the proper direction will release the slips. For this purpose we prefer to provide the neck with a plurality of curved faces 7; these faces are preferably two in number and disposed substantially diametrically opposite to each other. In the present instance relief faces are provided which will be brought in back of the slips by a relative rotation. This is preferably accomplished by providing faces disposed eccentrically to the longitudinal axis of the body 1, because the "low" end of the faces will become relieving faces when the releasing rotation occurs.

Figure 2:
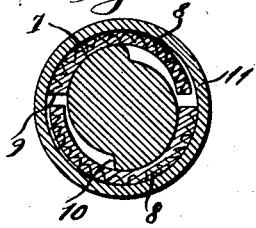
Figure 2 is a horizontal cross section on the line 2—2 of Figure 1, but, in addition, illustrating the manner in which the tool grips the inside of a twisted-off casing or drill column. This view shows the device in its gripping position.

Corresponding to each of the curved faces 7, we provide gripping members or slips 8 (see Figure 2). These slips are in arcuate form, but in the present instance are of gradually increasing width from one edge to the other in a circumferential direction. In other words, they may be described as curved wedges. Figure 2 shows these slips in a gripping position, the "high" portion of each curved face or cam 7 being disposed nearly opposite to the thick edge of the slip.

In the collapsed condition of the tool when it is lowered into the well, the butt end 9 of each slip would lie substantially against its corresponding shoulder 10. When in that position, the over-all diameter of the tapered neck and the slips is smaller than the inner diameter of the drill collar or tube 11, which is to be recovered, and which is referred to as the "fish".

In using the tool, it should be understood that it would be lowered into the well in its collapsed condition, and after being introduced into the upper end of the "fish", the tool string would be given a rotation in a direction to move the slips against the inner face of the wall of the "fish". As illustrated in Figure 2, this direction of rotation would be left-hand, or anti-clockwise, but this would depend upon the character of the thread in the tool string, and would be the same as the thread. In other words, if the tool string joints had right-hand threads, the rotation would be in a right-hand direction.

The body of the tool is provided with means for retaining the slips in position and maintaining them substantially in proper alignment. For this purpose each slip is provided at its upper end with a tang 12, which is in the form of an arcuate fin or extension that projects upwardly from the upper end of the slip. The lower end of the head 2 is provided with an annular apron or collar 13, the lower end of which extends down from the head 2 and encircles the tangs 12. Although the outside of this collar is cylindrical and of the same diameter as the head 2, the inner side of its wall is formed of two curved faces 13 and 14, which correspond to the faces 7 of the neck 4 and cooperate with them to form curved guide slots 15 in which the tang moves when the slip has its different movements. In other words, these slots 15 permit freedom of movement of each slip and the neck relatively to each other. Furthermore, it should be understood that the tangs are not secured in any way to the upper head 2, and there is perfect, but limited, freedom of movement of the slips in a vertical direction, or longitudinally of the axis of the tool.

Figure 5:
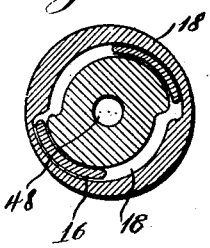
Figure 5 is a view similar to Figure 4, and also taken on the line 4—5 of Figure 1, but this view illustrates the relation of parts when the slips have been moved into their gripping position by the rotation of the body of the tool in anti-clockwise direction.
Figure 6:
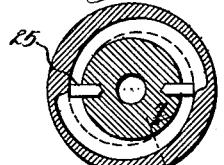
Figure 6 is a horizontal section taken on the line 6—6 of Figure 1 and illustrating details of an apron or collar, which we prefer to employ at the lower end of the tool.
Figure 7:
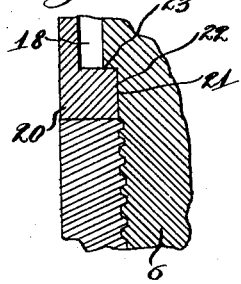
Figure 7 is a detail and may be regarded as a typical section through the base of the apron or collar illustrated in Figure 6. This section is taken about on the line 7—7 of Figure 6, but is upon an enlarged scale.

The lower end of each slip is provided with a tang 16 similar to the tang 12 at its upper end, and the tangs at the two ends are in line with each other. The lower ends of the slips are held in place through the agency of a retaining apron or collar 17 (see Figure 1), which performs a function similar to that of the apron 13. This apron 17 is constructed on its inside in a manner similar to the interior of the apron 13 (see Figure 5). In other words, the tangs 16 are freely movable in a rotary direction in the guide slot 18 formed between the eccentric faces of the neck 4 and the "parallel" or eccentric curved faces on the inner side of the apron.

The upper apron 13 may be rigidly secured to the head 2 by a tight key 19. The lower apron 17 has an integral disc 20 at its lower end with an opening 21 which seats over a plain cylindrical neck 22 and seats against an annular shoulder 23 of varying width, which is at the lower end of the tapered neck 4. Two keys 24 are provided which fit into slots 25 at diametrically opposite points of the opening 22 to keep this apron from changing its alignment. The apron is held in place by the head 5, already referred to, when it is screwed onto the threaded lower end of the mandrel.

The outer faces of the slips are provided with annular wickers 26 which incline upwardly, and these wickers are arranged in two zones between which a belt 27 of inclined teeth is provided. These teeth would incline in the direction indicated by the dotted lines in Figure 2, that is, they incline toward the wide end of the slips as viewed in Figure 2.

In using the fishing tool shown in Figure 1, we prefer to provide means for holding the slips in an elevated position on the tapered neck while the tool is being lowered down into a well. This is to keep the slips from falling down to the wide end of the neck 4. For this purpose we may employ a cord 28 of cotton or similar material, which is simply tied into a knot around the slips, as at 29. After the tool has been lowered to the position in which it is to be actuated, the rotation of the body of the tool will cause the string to break. It is not necessary, however, that the slips should be at their highest position. It is necessary, however, to have them commence to operate at a position above their extreme low position, because after they have been locked or gripped against the "fish", a slight relative downward movement of the slips can occur on the tapered neck when the tool string is pulled upwardly. This will cause the slip to bite more firmly into the wall of the "fish".

In operating the tool the slips can be caused to engage the fish by a relative upward movement of the wedge part of the tool, and the fish can afterward be released by relative rotation of the wedge part with respect to the slips, thereby moving the "high" part, that is to say, the thrust face of the wedge part, out of line with the slips.

When the invention is embodied in an "outside fish", we prefer to employ a construction such as illustrated in Figures 8 to 10, inclusive. In this case the retaining member for the slips 30 is in the form of a tubular mandrel or barrel 31, having the chamber 32 in its interior in which the slips are retained. The interior side of the wall of this chamber is formed with a plurality (for example, two) arcuate or curved faces 33, which are eccentric to the axis of the fishing tool. In this way two diametrically opposite shoulders 34 are formed, against which the wide edges 35 of the slips are normally placed. These slips have teeth or wickers 36 on their inner sides, and have curved outer faces 37 which cooperate with the cam faces 33. Figure 10 shows the slips in their withdrawn position. By rotating the fishing tool in a left-hand direction, the slips will be projected inwardly, as indicated in Figure 9, so as to cause them to grip the "fish" over which the fishing tool has been thrust. The slips are retained at their lower ends by means of a shoe 38, which is screw threaded into the lower end of the shell or barrel 31. The upper end of the tool has a head 39 with a tapered threaded box 40 to enable it to be attached to the lower end of the tool string.

If desired, the middle portion of the slips may be formed of the belt 41 of teeth, which should incline in the direction indicated by the dotted lines in Figure 9.

The bore through the shoe 38 has a large inclined counter-bore 42 at its lower end to facilitate passing the shoe over the upper end of the "fish".

If desired, each slip may be provided with a light leaf spring 43, which is placed in the shallow circumferential groove 44 at about the middle of the slip. This spring exerts its force in a direction to spring the slips inwardly toward the axis of the tool.

The upper end of the barrel or retainer 31 has an opening 45 through it of sufficiently small diameter to provide an annular shoulder 46 of varying width, which will prevent the slips from coming out through the upper end of the member 31.

These springs 43 also operate to hold the slips somewhat elevated in the tubular mandrel, so that after the slips have been locked on the "fish" by rotating the mandrel, the longitudinal inclination of the faces 33 with respect to the longitudinal axis of the tool will cause the slips to increase their grip on the "fish" as soon as the tool string is pulled upwardly.

The head 39 has a water bore 47 extending down through it for carrying water down through the tool.

A similar small water bore 48 is provided which extends constantly down through the interior of the fishing tool illustrated in Figure 1.

The fishing tool can be released from the "fish" either by a downward movement of the tool relatively to the "fish" or by a rotary movement of the tool relatively to the "fish" or by a combination of the two movements.

It is understood that the embodiment of the invention described herein is only one of the many embodiments this invention may take, and we do not wish to be limited in the practice of the invention, nor in the claims, to the particular embodiment set forth.

We claim:

1. A fishing tool for recovering "lost" objects from a well, having an elongated tapered retaining member for carrying slips, said retaining member having curved eccentric faces eccentric to its longitudinal axis, and slips in arcuate form carried by the retaining member, having curved faces on one side to cooperate with the curved faces of the retaining member, and having teeth on their opposite sides, said retaining members and said slips cooperating upon a rotation of the retaining member on its longitudinal axis to move the slips to grip the "lost" object, the said taper of the retaining member being in a direction to tighten the slips on the "lost" object when the retaining member is pulled upwardly.

2. In a fishing tool for fishing "lost" objects out of a well, the combination of an elongated body, a head at each end of the body, a plurality of slips carried by the body between the heads and retained by the said heads, said body having a plurality of curved eccentric faces eccentric to its longitudinal axis, said slips having curved faces on one side corresponding to the first-named faces, and having teeth on their other sides and cooperating with the said body upon a relative rotation of the body with respect to the slips on its longitudinal axis, to move the slips to grip the "lost" object, the said curved faces of the said body being inclined longitudinally of the body in a direction to tighten the slips on the object when the body is raised.

3. In a fishing tool for fishing "lost" objects out of a well, the combination of a retaining member in the form of an elongated body, a head at each end of the body, including a detachable head having a thread connection with the body, a plurality of slips carried by the body between the heads and retained by the heads, said body having a plurality of curved and eccentric faces eccentric to its longitudinal axis, said slips being of tapered form having curved faces on one side corresponding to the said eccentric faces, and having teeth on their other sides, said retaining member and said slips cooperating upon a relative rotation of the retaining member with respect to the slips on its longitudinal axis, to move the slips to grip the "lost" object, the said curved faces of said body being inclined with respect to the longitudinal axis of said retaining member and operating to tighten the grip of the slips on the "lost" object when the body is raised.

4. In a fishing tool for fishing "lost" objects out of a well, the combination of a body consisting of a mandrel having a tapered neck with the large end of the neck disposed downwardly, a plurality of slips carried on the outer side of said mandrel, means for retaining the same on the said neck while permitting free longitudinal movement of the slips on the neck, said neck having formed thereon a plurality of curved eccentric faces eccentric to its longitudinal axis, said slips having curved faces on their inner sides corresponding to the first-named faces, having teeth on their outer sides, and cooperating with said body upon a relative rotation of the body on its longitudinal axis, to move the slips outwardly to grip the "lost" object, the said tapered neck operating to tighten the grip of the said slips when the body is raised.

5. In a fishing tool for fishing "lost" objects out of a well, the combination of a body consisting of a mandrel having a tapered neck with the large end of the neck disposed downwardly, a plurality of slips carried on the outer side of said tapered necks and having tangs at their ends extending longitudinally of the body, said body having annular aprons extending over said tangs and cooperating with the same to retain the slips and permit relative longitudinal movements of the slips on the neck, said neck having a plurality of curved eccentric faces eccentric to its longitudinal axis, said slips having curved faces on their inner sides corresponding to the first-named faces, having teeth on their outer sides, and cooperating with the said neck upon a relative rotation of the body on its longitudinal axis, to move the slips outwardly to grip the "lost" object, the said tapered neck operating to tighten the grip of the said slips when the body is raised.

6. In a fishing tool for fishing "lost" objects out of a well, the combination of a body consisting of a mandrel with a tapered neck, having the large end of the neck disposed downwardly, a pair of slips carried on the outer side of said tapered neck, each of said slips having a tang at its upper end and a tang at its lower end extending longitudinally of the said body, said body having annular aprons extending over said tangs operating to retain the slips while permitting longitudinal movement of the slips on the neck, said neck having a pair of curved eccentric faces eccentric to its longitudinal axis, said slips having curved faces on their inner sides corresponding to the first-named faces, having teeth on their outer sides and cooperating with said body upon a relative rotation of the body on its longitudinal axis, to move the slips outwardly to grip the "lost" object, said tapered neck operating to tighten the grip of the said slips when the body is raised.

7. In a fishing tool for fishing "lost" objects out of a well, the combination of a body consisting of a mandrel with a tapered neck, having the large end of the neck disposed downwardly, a pair of slips carried on the outer side of said tapered neck, each of said slips having a tang at its upper end and a tang at its lower end extending longitudinally of the said body, said body having annular aprons extending over said tangs, to retain the slips while permitting longitudinal movement of the slips on the neck, said neck having a pair of curved eccentric faces eccentric to its longitudinal axis, said slips having curved faces on their inner sides corresponding to the first named faces, having teeth on their outer sides and cooperating with said body upon a relative rotation of the body on its longitudinal axis to move the slips outwardly to grip the "lost" object, said tapered neck operating to tighten the grip of the said slips when the body is raised, said aprons having eccentric inner faces cooperating with the corresponding eccentric faces of said neck to form arcuate guide slots for said tangs.

8. A fishing tool for recovering "lost" objects from a well, a plurality of slips, having an elongated retaining member for limiting the movement of the slips, said retaining member having curved eccentric faces eccentric to its longitudinal axis, said slips being of arcuate form and carried by the retaining member, said slips also having curved faces on one side to cooperate with the curved faces of the retaining member, and having teeth on their opposite sides, said retaining member and said slips cooperating upon a rotation of the retaining member on its longitudinal axis to move the slips to grip the "lost" object.

9. In a fishing tool for fishing "lost" objects out of a well, the combination of an elongated body, a head at each end of the body, a plurality of slips carried by the body between the heads and retained by the said heads, said body having a plurality of curved eccentric faces eccentric to its longitudinal axis, said slips having curved faces on one side corresponding to the first-named faces, having teeth on their other sides and cooperating with the said body upon a rotation of the body on its longitudinal axis to move the slips to grip the "lost" object.

10. As a new article of manufacture a slip for a fishing tool tapering in thickness in a direction longitudinally of the axis of the slip and tapering in thickness in a circumferential direction around the longitudinal axis of the slip.

11. As a new article of manufacture a slip for a fishing tool tapering in thickness in a direction longitudinally of the axis of the slip and tapering in thickness in a circumferential direction around the longitudinal axis of the slip, said slip having a tang of reduced thickness at each end of the same extending longitudinally of the ends of the slip and transversely curved to enable the slip to be retained in a fishing tool.

12. A well tool of the character described including, a body, a wedge part on the body having a thrust face, a slip mounted for co-operative movement along the thrust face to force the slip against the fish, said slip being capable of lateral movement to position out of engagement with the thrust face, and means preventing lateral movement of the slip in one direction on the wedge part.

13. A well tool of the character described including, a body, a wedge part on the body having a thrust face, slips mounted for co-operative movement along the thrust face to force the slip against the fish, said slip being capable of lateral movement to position out of engagement with the thrust face, and stops at the wedge part preventing lateral movement of the slips in one direction on the wedge part.

14. A well tool of the character described including a body having a wedge part tapered longitudinally of the tool, said wedge part being a thrust face, and a slip mounted for co-operative movement along the wedge part at the thrust face to engage the casing, said slip being capable of lateral movement out of alignment with the thrust face to release the slip from the casing.

15. In a well tool of the character described having slips for engaging a casing, the combination of a body having a wedge part tapered longitudinally of the tool, slips mounted for cooperative vertical movement along the wedge part to move the slip to engage the casing, said body having a relieved surface at the same level as the said wedge part enabling said slips and body to cooperate by a relative rotation of said body and said slips, to release the slips.

16. In a well tool of the character described having slips for engaging a casing, the combination of a body having a wedge part tapered longitudinally of the tool, slips mounted for co-operative movement along the wedge part to expand the slips to engage the casing, said body having a relieved surface located at the same level along the length of the body as said wedge part enabling said slips and body to co-operate by a relative rotation of said body and said slips, to release the slips.

Signed at Los Angeles, California, this 26 day of January, 1928.

IDRIS THOMAS.
ERNEST I. TIBBET.